United States Patent [19]

Christhilf et al.

[11] Patent Number: 4,631,083

[45] Date of Patent: Dec. 23, 1986

[54] PIPE VARNISH COMPOSITIONS AND USE THEREOF

[75] Inventors: Harold H. Christhilf, Trainer, Pa.; Paul E. Morrison, New York, N.Y.; Paul W. Niemczura, W. Chester, Pa.

[73] Assignee: Witco Corporation, New York, N.Y.

[21] Appl. No.: 745,762

[22] Filed: Jun. 17, 1985

[51] Int. Cl.$^4$ .............................................. C09D 5/08
[52] U.S. Cl. ............................... 106/14.23; 106/14.25; 106/14.29; 106/14.38; 106/264; 106/265; 427/388.1; 428/457; 524/166
[58] Field of Search ............... 106/14.05, 14.23, 14.25, 106/14.29, 14.38, 264, 265; 427/386, 388.1; 428/457, 458, 467; 524/166

[56] References Cited

U.S. PATENT DOCUMENTS

| | | | |
|---|---|---|---|
| 2,930,708 | 3/1960 | Chatfield | 106/14.22 |
| 3,453,124 | 7/1969 | Wurstner | 106/14.26 |
| 4,495,225 | 1/1985 | Ciuba et al. | 106/14.25 |

*Primary Examiner*—Lorenzo B. Hayes
*Attorney, Agent, or Firm*—Sidney Wallenstein; Ralph R. Rath

[57] ABSTRACT

Pipe varnish compositions effective to inhibit corrosion of steel pipe over appreciable periods of time of storage of said steel pipe, said compositions comprising a thixotropic overbased calcium organic sulfonate calcium carbonate complex; and a drying oil such as linseed oils; a drier, preferably of the paint drier type, such as cobalt naphthenate, zirconium octoate and manganese salts or soaps, or mixtures thereof; and also containing at least one member of the group of epoxidized oils, polybutenes, and alkyd resins; and, optionally, such ingredients as waxes, petrolatums and resins.

22 Claims, No Drawings

PIPE VARNISH COMPOSITIONS AND USE THEREOF

TECHNICAL FIELD

The present invention is directed to novel pipe varnish compositions which are used to coat steel pipe after the manufacture of such pipe to protect the pipe particularly against rusting or corrosion during temporary storage, temporary storage being variable in time but generally not exceeding about one year.

BACKGROUND PRIOR ART

The preparation of satisfactory or even reasonably satisfactory pipe varnish compositions for steel pipe during storage under atmospheric or weather conditions or the like has presented numbers of problems. Even today, in large plants which produce steel pipe, varnish compositions which are commercially used are commonly characterized, when applied to the steel pipe, by the usual spraying or otherwise coating of presently used pipe varnish compositions, by sagging which results in an uneven film build. In illustrative instances, the application of the pipe varnish compositions produce a film thickness of as little as 0.5 mils at the top of the pipe while, at the bottom of the pipe, there is literal dripping, creating undesirable "housekeeping" problems. Moreover, due to the marginal corrosion protection properties of various presently used pipe varnish compositions and the inconsistent and nonuniform film build, high rejection rates after outdoor storage of the varnished or coated steel pipe are encountered, being not uncommonly in excess of 30% after 6 months of outdoor storage. Such deficiencies have caused the rejection of appreciable amounts of steel pipe after outdoor storage with consequent substantial economic loss.

Traditional pipe varnishes comprise or consist of low cost quick drying alkyd resins cut back to about 50% solids with volatile organic solvents. Due to better solvency and a relatively fast evaporation rate a solvent such as xylene is commonly used. This choice of such solvents creates an extreme fire hazard in plant operations as the flash point is generally in the range of 70°-85° F. Such traditional pipe varnish compositions commonly have marginal corrosion resistance. They give only 100–200 hours salt fog protection at 1 mil dry film. The relatively low solids content and lack of any thixotropic character give traditional pipe varnish compositions bad film build and application characteristics. When spray applied to a hopefully consistent 2 mils film thickness, such pipe varnish compositions, as noted above, display very bad film sag (running) on curved surfaces. This results in low film thickness, as stated above, on the top of the pipe and an over-build and dripping of the pipe varnish composition on the bottom of the pipe.

Many efforts have been made over a substantial period of time to solve the problems and to attempt to arrive at suitable, or at least reasonably suitable, pipe varnish compositions. Certain of such efforts have involved the utilization in admixture with hydrocarbon resins such as ESCOREZ (Exxon Company) and with known volatile organic solvent-based wax-modified rust or corrosion-inhibiting compositions (hereafter referred to as "corrosion-inhibiting compositions") of the type of inorganic-organic complexes in the form of thixotropic overbased calcium organic calcium sulfonates complexed with calcium carbonate, and in certain cases in conjunction with one or more additional ingredients, particularly more than one, selected from the group of petrolatums; oxidized petrolatums; waxes such as slack wax, and crude or refined microcrystalline waxes (non-oxidized or oxidized); various resins; and the like. The thixotropic overbased calcium organic sulfonates sought to be so utilized are, per se, well known to the art as corrosion-inhibiting coating compositions, one well known group being sold under the registered trademark "SACI" (Witco Chemical Corporation, New York, N.Y.), being advantageously derived from alkyl benzene sulfonic acids in which alkyl contains from 12 to 30 carbon atoms. These thixotropic overbased organic sulfonates comprise, most advantageously, complexes of calcium organic sulfonates with crystalline calcium carbonate in colloidal or extremely finely divided form. While the use of such proposed pipe varnish compositions brings about certain improvements in relation to producing films having appreciably reduced sagging problems and in various other respects, other deficiencies, such as, for instance, the extent of resistance to deterioration in relation to ultraviolet light (U.V.) and inadequacy of film hardness, and also cost factors, has resulted in a failure commercially satisfactorily to meet the problems.

BACKGROUND AND DESCRIPTION OF PRIOR ART

Over a period of a great many years, numerous corrosion-inhibiting coating compositions have been proposed, and many of which have been used commercially, for the coating of ferrous (and non-ferrous) metals, which are susceptible to rust or corrosion, to prevent or to inhibit such rust or corrosion. As has long been known, rust or corrosion is caused by environmental conditions, such as contact of the metal surfaces by water; by air, particularly moist air; and by various chemicals or other materials which come into contact with the metal surfaces. The corrosion-inhibiting compositions which have been suggested, or which have been or are currently being commercially used, fall, generally speaking, into two classes, one being compositions which form coatings in relatively thin films and which are soft, and are commonly of a character such that they may readily be stripped off or removed from the metal surfaces, for example, by organic solvents, where it is necessary to remove the coatings at periodic intervals to carry out repairs or the like on the metal surfaces, after which they are recoated; and the other comprises compositions which form coatings in relatively thin films and which are hard and of a character such that they are, and are intended as, essentially permanent coatings and are removable only with great difficulty.

Since the pipe varnish compositions of our present invention are of the type which involve the use of inorganic-organic complexes which, as noted above, comprise thixotropic overbased calcium organic sulfonates complexed with calcium carbonate, as one of the essential ingredients of said pipe varnishes, it is to be noted, as pointed out above, that the prior art has long known of such inorganic-organic complexes, and of corrosion-inhibiting coating compositions which contain, as one of the ingredients thereof, the aforesaid inorganic-organic complexes.

The use as corrosion-inhibiting coating compositions, which contain thixotropic, or grease-like or gel-like thixotropic, calcium organic sulfonates complexed with calcium carbonate, with or without admixture with polymers, resins, or waxes, in a carrier or diluent of volatile (or nonvolatile or mixtures of volatile and nonvolatile) hydrocarbons and/or other liquid solvents, is well-known to the art and is disclosed in such U.S. Pat. Nos. 3,925,087; 3,453,124; 3,492,231; 3,565,672; 3,565,843; 3,661,622; 3,746,643; and 3,816,310, and other patents referred to in the specifications of such said numbered patents. Various of such corrosion-inhibiting compositions are known to have a certain utility for a variety of purposes, some including float coating or flotation coating of the insides of tanks, e.g., ballast tanks for ships, barges, off-shore oil rigs, etc., wherein, for instance, the tank is filled with water, the lighter-than-water corrosion-inhibiting composition is poured onto the surface of the water, and the water is then drained from the tank, and the floating layer of anticorrosion agent deposits on the side walls and bottom of the tank as the water drains out. Other uses for various of said corrosion-inhibiting compositions include, for instance, automobile and truck body undercoatings, and others for use in other environments.

U.S. Pat. No. 3,925,087 discloses corrosion-inhibiting compositions which comprise (a) about 10 to about 30% by weight of a corrosion-inhibiting grease-like concentrate comprising a thixotropic inorganic-organic complex stably dispersed in an essentially inert liquid oily phase in an amount not to exceed 4 parts, per part of said complex, of said essentially inert liquid oily phase, said inorganic-organic complex comprising a thixotropic overbased calcium organic sulfonate complexed with calcium carbonate; (b) about 2 to about 10%, by weight of a drying oil, particular tung oil, said drying oil being miscible with a diluent oil selected from the group consisting of aliphatic hydrocarbon diluents, cycloaliphatic hydrocarbon diluents, aromatic hydrocarbon diluents, and mixture thereof boiling at temperatures above 150° C.; and (c) from at least 60% by weight to essentially the balance of said compositions being the aforesaid diluent oil or oils.

The said U.S. Pat. No. 3,925,087 expressly states, in Column 6, Lines 36-43, that "too much of the drying leads to the formation of cracks in skin * * *." From 3 to 9% by weight of drying oil is adequate, 6-8% by weight being preferred.

The said U.S. Pat. No. 3,925,087 also makes reference, in Column 1, last paragraph, leading over through Line 21 of Column 2, to one commercial source of inorganic-organic complex compositions which comprise gel-like thixotropic overbased calcium organic sulfonates complexed with calcium carbonate, which compositions contain, or may contain, a petroleum resin or a wax or the like, all distributed throughout a hydrocarbon solvent. Reference is made to products commercially sold under the trademark "SACI", two of such "SACI" products, namely, "SACI"-200 and "SACI"-300, being specifically disclosed as exemplary of said "SACI" products. Such "SACI" products are stated to constitute formulations containing the aforementioned thixotropic overbased calcium organic sulfonates complexed with calcium carbonate, namely, the inorganic-organic complexes used as one of the ingredients of the corrosion-inhibiting compositions of said U.S. Pat. No. 3,925,087, but that the "SACI" products generally are not the inorganic-organic complexes per se. The patent discloses the use of the "SACI"-200 and "SACI"-300 products, as they are commercially marketed and sold, in the production of the corrosion-inhibiting compositions of said patent.

In Column 4, Lines 40-56, of said patent, it is pointed out that, since typical grease-like concentrates of the inorganic-organic complex, e.g., such as the "SACI" products, contain more than 25%, and typically 50-70%, by weight of the complex per se, the proportions of the essential ingredients of the corrosion-inhibiting compositions of the invention of said patent can be restated as follows:

a. about 5 to 15% by weight of the inorganic-organic complex;

b. about 2 to about 10% by weight of the drying oil; and c. essentially the balance to 100% (e.g., at least 75% by weight) of hydrocarbon oil diluent. It then states that the active ingredients, expressed in such manner, are in a complex/drying oil ratio of about 1:1-3:1, and that dilution of the active ingredients to, for example, the 50-300 cps level, permits deposition of at least about 1.0 gram of these active ingredients per square meter of metal to be protected.

The said U.S. Pat. No. 3,925,087 contains 25 Examples, exclusive of four Examples (C-1 to C-4) which contained only a "SACI" product and a naphthenic oil, without any drying oil, as Control Formulations; of the Nos. 1 to 25 Examples, some contain only a naphthenic oil solution of tung oil without any "SACI"; others contain a naphthenic oil solution of "SACI"-200, or "SACI"-300 (Examples 2 and 17-19) and tung oil with no drier, falling within the scope of the invention of said patent; others contain a naphthenic oil solution of "SACI"-200 and linseed oil, with or without driers, apparently falling within the scope of said invention; and others comprise a naphthenic oil solution of "SACI"-200, and tung oil in amounts of 20 and 30 wt. % of the formulation (Examples 14 and 15) and falling outside of the scope of the invention of said patent. The patent also states that the corrosion-inhibiting compositions of the invention thereof may contain petroleum resins or waxes, which may be added, or which may be present in the particular "SACI" product utilized, as, for instance, "SACI"-300 (see Column 1, last paragraph thereof, and Example 2). The compositions 14, 15 and 16, shown in the last paragraph of Column 8 of U.S. Pat. No. 3,925,087, disclose, respectively, the following formulations:

| Example | Ingredient In Percent by Weight | | |
|---|---|---|---|
| | Naphthenic Oil | "SACI" 200 | Tung Oil |
| 14 | 75.0 | 5.0 | 20 |
| 15 | 65.0 | 5.0 | 30 |
| 16 | 75.0 | 15.0 | 10 |

By reference to Table I in Column 10 of said patent, Saltspray Tests of the aforementioned Examples 14, 15 and 16 show time periods of 5, 6 and 28 hours, respectively, before Failure, which are tantamount to utter failure or inoperativeness of such compositions in corrosion resistance in standard Saltspray tests. Indeed, in the file wrapper contents of U.S. Pat. No. 3,925,087, in the AMENDMENT filed March 10, 1975, in the first paragraph at Page 9 of said AMENDMENT, reference is specifically made to "increasing the proportion of tung oil" at the expense of the "SACI" also results "in rapid failure of the coating", specific reference being made to the aforesaid Examples 14–16 of said Patent. Indeed, even with as high as 10% of tung oil in admixture with the naphthenic oil and the "SACI" 200 (Example 16 of the Patent) Saltspray Test failure occurred at the end of 28 hours which, as the same AMENDMENT states on the same Page 9 showed a "substantial falling off of the performance when the amount of drying oil exceeds the claimed maximum level" (to wit, 10% tung oil), it being asserted that the amount of tung oil be "about 10% or less, more preferably about 9% or less." Even Examples 5, 6 and 7 showed Saltspray Test results which, from a practical standpoint, were commercially valueless in contrast to the corrosion-inhibiting compositions of Examples 1, 2 and 3, and other compositions presumably forming a part of the invention of said Patent but with hardly effective Saltspray Test values.

The corrosion-inhibiting compositions of said patent are stated to form solid protective coatings which are soft or tacky, rather than brittle, and have little or no tendency to crack. They are stated to be particularly adapted for the coating of the inside of tanks and are best applied by a flotation coating procedure, or by spraying, which comprise zero or minimal shear force methods of application of the corrosion-inhibiting compositions to the metal surface for coating the same, and that they possess the advantageous property of the entire protective coating on a metal surface of said corrosion-inhibiting compositions being easily stripped off with unheated degreasing solvents.

With further regard to the disclosures of the aforementioned prior art patents, U.S. Pat. Nos. 3,453,124 and 3,565,843, said patents are disclosed as describing, illustratively, what said U.S. Pat. No. 3,925,087 refers to as the rust-inhibitive, grease-like concentrate comprising the thixotropic inorganic/organic complex stably dispersed in an essentially inert liquid oily phase constituent of the corrosion-inhibiting compositions of the invention of said U.S. Pat. No. 3,925,087. A more complete discussion of the disclosures of said U.S. Pat. Nos. 3,453,124 and 3,565,843, as well as the other above-cited patents, is believed to be here in order and is noted below.

U.S. Pat. No. 3,453,124 discloses, among other things, the preparation of inorganic-organic complexes in the form of thixotropic overbased calcium organic sulfonates complexed with calcium carbonate, dispersed, in the form of colloidal particles, in oil carriers such as mineral oils or other nonvolatile carriers or media, as well as other carriers or media which are volatile, such as mineral spirits, and, also, mixtures of nonvolatile and volatile carriers or media. It also discloses corrosion-inhibiting coating compositions for the treatment of ferrous (and nonferrous) metals which comprise, as essential components of the invention of said patent, reaction products of the aforesaid inorganic-organic complexes, colloidally dispersed in said carriers or media, with phosphoric acid esters of alcohols. In Column 40, Lines 48–75, of said patent, it is stated that particularly useful corrosion-inhibiting compositions are obtained when certain types of hydrocarbon resins are added to the aforesaid reaction products, in that said resins impart to the coating compositions the property of forming coatings on the metals which are firm rather than being soft and greasy, firm coatings being advantageous because they provide additional resistance to abrasion, dirt pickup, gravel pickup, etc.; and they avoid the disadvantages of soft grease-like coatings which are easily removed by contact of such coatings by humans and animals.

The said U.S. Pat. No. 3,453,124 also discloses, in Columns 43 and 44, the results of comparative corrosion tests with illustrative corrosion-inhibiting compositions of said patent and with commercial automobile undercoating compositions, which latter include a petrolatum undercoating composition; an undercoating composition comprising SAE 40 oil, a rust inhibitor, and a drying oil; a petroleum base translucent film; and an asphalt cutback undercoating composition; in which comparative tests of corrosion-inhibiting compositions made in accordance with the claimed invention of said patent are shown to be superior.

U.S. Pat. No. 3,492,231 discloses methods for the preparation of the inorganic-organic complexes, which can be used to prepare corrosion-inhibiting compositions of the inorganic-organic complexes which can be used as one of the ingredients for preparing the pipe varnish compositions of our present invention. The said patent also discloses the utility of said inorganic-organic complexes in the production of corrosion-inhibiting compositions for use on metals.

U.S. Pat. No. 3,565,672 discloses methods for the preparation of mineral oil solutions of inorganic-organic complexes, which complexes are of the type which are used in the preparation of the pipe varnish compositions of the present invention; and said patent also discloses the utility of said inorganic-organic complexes as corrosion-inhibitors.

U.S. Pat. No. 3,565,843 discloses rust-inhibiting compositions which form hard coatings which are almost tack-free to the touch by spraying on metal surfaces, which compositions comprise (a) about 10 to 35 wt. % of an inorganic-organic complex in the form of an overbased organic calcium sulfonate which has been admixed with aqueous ammonia under conditions to form a gel, which is, in fact, a thixotropic gel; (b) about 5 to 15 wt. % of a coating material selected from the group consisting of a hydrocarbon polymer resin and a combination of a hydrocarbon polymer resin, an ethylene-vinyl acetate copolymer having a specified melt index, and a wax, and wherein said hydrocarbon polymer resin has a specified molecular weight and a specified softening point; and (c) about 55 to 85 wt. % of a hydrocarbon solvent having a boiling point range of about 270° to 450° F.

U.S. Pat. No. 3,661,622 discloses, among other subject matter, the preparation of thixotropic overbased calcium organic sulfonates, complexed with calcium carbonate; the admixture therewith of certain polymers such as low density polyethylene, polypropylene, etc.; copolymers of the foregoing with vinyl monomers such as ethylene-vinyl acetate; polymethyl methacrylate and others; and the preparation of corrosion-inhibiting primer coating compositions containing the aforesaid ingredients. The inclusion of the polymers, as is pointed out in Column 11, Lines 45–65, serves, among other functions, to produce films which are harder, tougher and less tacky than primer compositions which do not contain such polymers. The primer compositions are stated to be desirably applied to metal surfaces to be coated in the form of a volatile organic solvent solution, said primer composition solution being applied by brush coating or by spraying, and evaporating the volatile organic solvent from the primer composition film, after which a conventional paint is applied.

U.S. Pat. No. 3,746,643 discloses viscous, high melting point corrosion or rust-inhibiting coating compositions for metals which comprise a solution in a volatile hydrocarbon solvent, such as Stoddard solvent, which solution may also contain some mineral oil, of an inorganic-organic complex in the form of a thixotropic overbased calcium organic sulfonate complexed with calcium carbonate, and which coating composition contains certain proportions of microcrystalline wax. The novelty in this patent resides in the incorporation of microcrystalline wax into the composition, which imparts an unexpected marked increase in the resistance to rusting of dip-coated steel panels, as demonstrated by Weatherometer testing, over similar coating compositions not containing microcrystalline wax, or over similar coating compositions containing ordinary paraffin waxes.

In addition to the disclosure in the aforementioned U.S. Pat. No. 3,925,087 of certain "SACI" products as commercial sources of products for or containing the known rust-inhibiting thixotropic inorganic-organic complexes in the preparation of the particular corrosion-inhibiting compositions of said patent, as described above, there are also known to the art other "SACI" corrosion-inhibiting products which contain as an ingredient thereof thixotropic inorganic-organic complexes of the type which are disclosed in the particular "SACI" products which are referred to in U.S. Pat. No. 3,925,087 and which "SACI" products can, under certain circumstances, also be used as the inorganic-organic complexes of the novel pipe varnish compositions of our present invention. Such additional "SACI" products are disclosed in various Technical Data sheets dealing with various "SACI" products.

"SACI" 700 is the source of the thixotropic overbased inorganic-organic complexes used in all solvent/mineral oil dissolved "SACI" products, with the exception of "SACI" 760 (discussed below). With respect to products identified as "SACI"-100 and 100-A, "SACI"-200 and 200A, "SACI"-300 and 300A, "SACI"-2400, "SACI"-2452 and "SACI"-2460, they all have various levels of one or more waxes, oxidized petrolatums, mineral oils or other additives in conjunction with the thixotropic overbased inorganic-organic complexes found in "SACI" 700. All of these "SACI" products are capable of being formulated with both refined and unrefined waxes, petrolatums, resins, polymers, asphalts, oils, and aliphatic and aromatic solvents to achieve various levels of solids, activity, and/or viscosity.

"SACI" 760 is a colloidal dispersion is mineral spirits of a thixotropic overbased calcium organic sulfonate complexed with calcium carbonate. Said "SACI" 760 product contains 60 wt. % of said complex and 40 wt. % of mineral spirits. The thixotropic overbased inorganic-organic complex present in "SACI" 760 is somewhat less thixotropic than the thixotropic overbased inorganic-organic complex present in "SACI" 700. This allows bulk handling at higher solids levels of the thixotropic overbased inorganic-organic complex than in the case of "SACI" 700 in the preparation of the novel pipe varnish compositions of our present invention. The organic portion of said organic sulfonate is derived from a linear alkylbenzene sulfonic acid.

With further respect to the Technical Data sheets in regard to the aforesaid products identified as "SACI"-100 and 100A, "SACI"-200 and 200A, "SACI"-300 and 300A, "SACI"-2400, "SACI"-2452 and "SACI"-2460, except as noted hereafter, the aforesaid "SACI" products contain a thixotropic overbased calcium organic sulfonate complexed with calcium carbonate colloidally dispersed in a volatile hydrocarbon solvent (mineral spirits), or in a paraffinic mineral oil, or in a mixture of said mineral spirits and said mineral oil. The organic sulfonate part of the thixotropic overbased calcium organic sulfonate-calcium carbonate complexes of the aforesaid "SACI" products is derived from the use of branched chain or linear/straight chain monoalkylbenzene or dialkylbenzene sulfonic acids or mixtures of such sulfonic acids, the alkyl radical or radicals containing at least 12 carbon atoms and generally in the range of from 12 to 30 carbon atoms.

"SACI"-100 and 100A concentrates are colloidal dispersions of said complex in a mixture of mineral spirits and a paraffinic mineral oil. "SACI"-100A also contains oxidized petrolatum for improved anti-corrosion properties. "SACI"-100 contains 60, 50 or 40 wt. % solids, depending on its content of mineral spirits. Coatings made with its listed basic composition are generally stated to be formulated with waxes (refined and unrefined); petrolatums; oxidized petrolatums, those having an Acid No. of 15-20 being recommended; pigments; resins; and asphalts. Coatings made with "SACI"-100 and 100A concentrates are stated to produce films which are soft; oily and self-healing. Salt fog tests on "SACI"-100 and 100A show 500 hours to failure for "SACI"-100 and 600 hours to failure for "SACI"-100A with a dry film thickness of 0.5 mil; 1000 hours to failure for "SACI"-100, and 1200 hours to failure for "SACI"-100A with a dry film thickness of 1.0 mil.

"SACI"-200 and 200A are colloidal dispersions of said complex in a paraffinic mineral oil. "SACI"-200A contains 36 wt. % of said complex and 64 wt. % mineral oil. "SACI"-200A also contains oxidized petrolatum. The other statements made as to "SACI"-100 and 100A are applicable to "SACI"-200 and 200A.

"SACI" 300 is a colloidal dispersion of a thixotropic overbased inorganic-organic complex in mineral spirits containing about 35 wt. % of said complex and about 37 wt. % of said mineral spirits, with minor proportions of a microcrystalline wax and a paraffinic mineral oil to provide a corrosion-inhibiting composition which is stated to have exceptional protection properties in salt water immersion and salt atmospheres; that typical applications include outdoor parts storage, automobile body rust protection, coatings for underground pipe, marine applications and protection of overseas shipments; that "SACI" 300 wax-like coatings can be used in organic solvent dilutions or in combination with asphalts or petrolatums where long-term protection and relative ease of removal are important; and that the films resulting from using the basic formulation of SACI are firm and waxy. "SACI"-300A is similar to "SACI"-300; but it also contains oxidized petrolatum. Salt fog tests on "SACI"-300 and "SACI"-300A show, among other thicknesses of dry films, 300+ hours to failure for "SACI"-300 with an 0.5 mil dry film thickness and 800+ hours to failure with "SACI"-300A with the same film thickness; and, where the film thickness is 1.0 mil, 800+ hours to failure for "SACI"-300 and 1500+ hours to failure for "SACI"-300A. With films of 5.0 mil thickness, "SACI"-300 showed failure after 2000+ hours, and "SACI"-300A showed failure at 3000+ hours.

Other commercial "SACI" products are, as noted above, "SACI"-2400, "SACI"-2452 and "SACI"-2460. These "SACI" products are all corrosion-preventive concentrates in the form of mineral spirits-wax colloidal dispersions. They are stated to have a high content of the thixotropic inorganic-organic complex (65 wt. % solids in-"SACI"-2400, 52 wt. % in "SACI"-2452, and 60 wt. % solids in "SACI"-2460). They are stated to be formulatable with both refined and unrefined waxes, petrolatums and oxidized petrolatums, resins, polymers, asphalts, oils, and aliphatic and aromatic solvents to achieve virtually any solids, activity and/or viscosity level desired. Salt fog data are presented utilizing dry film thicknesses of 0.5 mil and 1.0 mil, hours to failure with 0.5 mil being 500, and hours to failure with 1.0 mil being 1100.

"SACI" 700, referred to above, is a colloidal dispersion of said complex in mineral spirits, the solids content of which, namely, the thixotropic overbased complex, is substantially 50 wt. %, and the mineral spirits content of which is substantially 50 wt. %. It is stated in "SACI" 700 Technical Data sheets that the "SACI" 700 must be used with an added plasticizer or resin for effective protection; and, generally, that "SACI" 700 can be formulated with hydrocarbon resins, asphalts, waxes, mastics, petrolatums and oils to produce a variety of effective coatings. Also shown are the results of salt spray and humidity cabinet corrosion tests.

SUMMARY OF THE INVENTION

Our present invention is based on discoveries that improved pipe varnish compositions can be obtained which are characterized by particularly effective corrosion resistance, water displacement, thixotropy, U.V. resistance and film hardness and effective dry time of the films resulting from the application of the pipe varnish compositions of our invention to steel pipes as produced at steel mills and like facilities where steel pipes are produced, and then stored, prior to usage, for appreciable periods of time.

The novel pipe varnish compositions of our present invention are obtained by combining or admixing thixotropic overbased calcium organic sulfonates complexed with calcium carbonate; drying oils; driers; epoxidized oils and/or polybutenes; convertible resins, particularly certain alkyd resins; with or without other ingredients which are advantageously included such as waxes, other resins, and non-skinning agents, in certain specified ranges of proportions, all as is pointed out in detail below, and dissolved or colloidally or finely dispersed in a volatile organic solvent for desired application to the steel pipe by spraying to deposit, desirably, even films or coatings on the surfaces of the steel pipes to deposit thin films which cure at ordinary outside temperatures to form corrosion-inhibiting coatings or films. The pipe varnish compositions of our invention are of the type which produce relatively hard films and, therefore, they do not contain appreciable proportions of mineral oils or other oils which would make for soft or oil films or coatings. Hence, commercially marketed "SACI" compositions, such as have been described above, which are of the type which contain appreciable proportions of mineral oils are not a desirable source of the inorganic-organic complexes, which latter constitute one of the essential ingredients of the pipe varnish compositions of our present invention, because it is uneconomic and not commercially feasible to use such "SACI" compositions due to the general necessity of removing the relatively high contents of mineral oils therefrom before use in producing the pipe varnish compositions of our invention. On the other hand, such "SACI" compositions as, for instance, "SACI" 700 AND "SACI" 760 are excellent starting materials for the preparation of the pipe varnish compositions of our invention because they consist essentially of the thixotropic overbased calcium organic sulfonates complexed with calcium carbonate, and dissolved or colloidally dispersed in mineral spirits or other volatile solvents and are readily formulatable by the addition of the other ingredients which are essential to the preparation of the pipe varnish compositions of our invention.

Those inorganic-organic complexes which are particularly useful in the preparation of the pipe varnish compositions of our invention have base numbers in the range of about 200 to 350; or, stated in terms of their metal ratios, they have metal ratios of at least 4.5, and particularly in the range of about 7 to about 12. Although any thixotropic overbased calcium sulfonate/calcium carbonate complex is acceptable or reasonably satisfactory in the production of the novel pipe varnish compositions of our present invention, particularly advantageous is "SACI" 760 due to, as mentioned above, its lower thixotropy which allows the preparation of reasonable viscosity anticorrosive pipe varnish compositions in accordance with the broader teachings of our present invention.

With respect to the drying oils, while any drying oils, generally speaking, are usable to at least some extent in the pipe varnish compositions of our invention, linseed oils are especially suitable. Other drying oils which have relatively similar properties can be used wholly in place of or in admixture with linseed oil, as, for example, tung oil, walnut oil, and dehydrated castor oil. Other drying oils are oiticica oil, fish oils and synthetic unsaturated oils. The natural oils can be used as well as modified drying oils such as blown, heat bodied, polymerized and isomerized drying oils and, also, synthetic drying oils. Especially satisfactory are blow or bodied linseed oil, but raw linseed oil is acceptable. As a part of the drying oil component, but as contributing a significant part of such drying oil component of our pipe varnish compositions, are convertible resins which comprise metallic drier reactive resins typically but not exclusively containing polyunsaturated esters. Furthermore, convertible resins encompass such materials as those alkyd resins which are known to possess properties similar to drying oils proper.

The driers which are utilized in the corrosion-inhibiting compositions of our invention, in its broader aspects, are conventional driers which, typically, are of the paint drier type. They are, generally speaking, polyvalent, usually divalent, metal salts of soap-forming carboxylic acids. Illustrative examples of such driers are naphthenates, tallates, and octoates of such metals as cobalt, zirconium, lead, nickel, zinc, chromium and manganese, or mixtures of two or more of such driers. Of especial utility for use in the preparation of the pipe varnish compositions of our invention are mixtures of the foregoing salts of cobalt and zirconium, especially mixtures of cobalt naphthenates and zirconium octoates. The cobalt salt functions generally as a "surface" drier and acts to quickly and tacklessly cure the surface of inorganic-organic complex (e.g. "SACI") drying oil systems. The zirconate salt driers coact with the cobalt salt driers to very materially enhance the dry-through and cohesion of the coating on films of the pipe varnish compositions to the surfaces of the steel pipes. We have also found the inclusion of small amounts of manganese salt driers in place of some of the zirconium salt driers is advantageous despite a slight drop in salt fog results since it yields films with significantly improved outdoor durability and is cost effective. The drier is used in distinctly small proportions, generally in the range of about 0.3 to about 2 wt. %, more commonly about 0.4 to 0.6 wt. % (calculated as the metal) of the pipe varnish composition, the amount depending, in part, on the wt. % of drying oil, or drying oil and convertible resin solids, used or present in any given pipe varnish composition or formulation.

With due regard for the fact that the amounts of metallic driers used in the pipe varnish compositions of our present invention, and the amounts of such driers are conventionally defined as percent metal based upon vehicle solids, metallic driers are conventionally purchased in the form of solutions in organic solvents, commonly in the form of such solutions containing 12% of a given metal, as a salt such as a naphthenate or an octoate, in solution. By knowing the concentration of metal in a particular drier and by knowing the vehicle solids and the percent metal wanted on vehicle solids in a desired pipe varnish composition made in accordance with our invention, the actual amount of metallic drier (solution) to use is readily ascertained by the formula $$\text{Drier (solution) in wt. \%} = \frac{\text{\% metal on vehicle solids desired} \times \text{vehicle solids}}{\text{\% concentration of metal in drier solution}}$$

Thus, in Example 2 of the pipe varnish composition which represents the best embodiment of our invention of which we are presently aware and in which the drier amounts are considered optimal, the % metal on vehicle solids is stated to be cobalt 0.09, zirconium 0.2 and manganese 0.08, the vehicle solids are 18.6 wt. parts vehicle solids (made from the sum of linseed oil 9.3 wt. parts solids and "Beckosol" 10-088 (70% N.V.) $13.3 \times 70\%$ solids $= 9.3$ wt. parts solids). This provides the full information to calculate the actual amount of drier solution to be added, namely:

$$Co = \frac{0.09 \times 18.6}{12} = 0.1395 \approx 0.14 \quad (1)$$

$$Zr = \frac{0.2 \times 18.6}{12} = 0.31 \quad (2)$$

$$Mn = \frac{0.08 \times 18.6}{12} = 0.124 \approx 0.12 \quad (3)$$

The volatile organic solvents which, in certain embodiments of our invention, are utilized, can be of aliphatic, cycloaliphatic or aromatic character, and include hydrocarbons, chlorinated hydrocarbons, alcohols, ketones and ethers which are compatible in the system. Preferred volatile organic solvents are aliphatic solvents, especially suitable being odorless mineral spirits because of its low toxicity and relatively low cost as well as its advantageous flash point. Other volatile organic solvents which can be used are disclosed in the above-mentioned U.S. Pat. No. 3,453,124, in Column 3, the disclosure of which volatile solvents is herein incorporated by reference. For safety purposes, organic solvents should have a flash point of at least 105° F. In the case of pipe varnish compositions of our invention which contain a relatively high level of modifying resins, volatile organic solvents having stronger solvent properties than mineral spirits are sometimes required. In such cases, volatile organic solvents with high aromaticity are used. They are generally used in amounts of about 25 to about 40 wt. % of the pipe varnish compositions as a whole, but somewhat lower or higher wt. % amounts can be used.

For optimal results, it is especially advantageous to incorporate agents which enhance the adhesion of the pipe varnish compositions of our invention to the surfaces of the steel pipe. Epoxidized oils have been found to be very useful for this purpose. While epoxidized oils are, per se, well known to the art, so far as we are aware, they have not been used in pipe varnish compositions such as those of our present invention. When so used, they also serve to promote compatibility and to improve flexibility of the coatings on the steel pipe surfaces, as well as to enhance the adhesion of the films or coatings to the steel pipe surfaces. They have little effect on salt fog performance. Illustrative epoxidized oils are those prepared by the epoxidation of triglyceride oils, including semi-drying oils, and, particularly, drying oils of natural or synthetic character, among which are tung oil, dehydrated castor oil, corn oil, cottonseed oil, soya bean oil, walnut oil, and fish oils. Particularly satisfactory is epoxidized linseed oil, exemplified by the product sold under the trademark "DRAPEX" (Argus Chemical Corporation), in which the epoxide equivalent is 10.4. It is preferred to use epoxidized oils which have high oxirane contents. They are advantageously utilized in small proportions, generally of the order of about 3 to 5 wt. % of the pipe varnish compositions as a whole.

We have also found that in place of, or together with, epoxidized oils, polybutenes, exemplified by Polybutene (S-24), are also highly effective, indeed, superior to epoxidized oils such as "Drapex" 10.4, as an adhesion improver, and, generally, possessing less water and U.V. sensitivity, in the pipe varnish compositions of our invention when used in approximately the same proportions as stated above for the epoxidized oils.

Petrolatums and/or oxidized petrolatums, and, also, microcrystalline waxes and slack wax, crude and refined, as well as greases such as Baytown Grease, can be and generally desirably are used in the pipe varnish compositions of our invention, in small proportions, commonly in the order of about 2 to about 5%, or somewhat more or less. They tend to enhance corrosion-inhibition and water resistance and are most effective. They are all, per se, well-known to the art and require no extensive elaboration as to what they are. Petrolatums and oxidized petrolatums may be defined, respectively, as purified mixtures of semisolid hydrocarbons derived from petroleum and their oxidation products. Microcrystalline waxes may be defined as higher melting point waxes purified from petrolatums.

Resins, which can be used in the pipe varnish compositions of our invention, can be of diversified types. Those which are used are water-insoluble and soluble or readily dispersible in the volatile organic solvents which are used in the preparation of the pipe varnish compositions of our invention. Where used, they include, by way of illustration, hydrocarbon resins (petroleum and non-petroleum), unmodified or modified, and sold under such trademarks as "PICCOPALE" (Hercules, Inc.) "BETAPRENE" (Reichhold Chemical Company); and particularly, convertible resins, for instance, alkyd resins such as those sold under the trademarks "BECKOSOL" (Reichhold Chemical Company), and "AROPLAZ", for example, "AROPLAZ" 1266-M-60, 1266-M-70 and 1271 (Ashland Chemical Company); epoxy ester resins such as those sold under the trademarks "EPOTUF" (Reichhold Chemical Company); oil-modified polyurethane resins such as those sold under the trademark "UROTUF" (Reichhold Chemical Company); and thermoplastic resins of various types such as acrylic resins and some of which are sold under the trademark "ACRYLOID"-acrylic resins (Rohm & Haas Co.); SBR resins; and vinyl resins such as those sold under the trademark "GEON" (B. F. Goodrich Chemical). The proportions of the resins are variable, but it is preferred that they be used in amounts ranging from about 3 to about 15 wt. % of the pipe varnish compositions as a whole. Convertible resins, for instance, such as various alkyd resins exemplified by "Beckosol" 10-027 (60% N.V.) and "Beckosol" 10-088 (70% N.V.), are resins which, as noted above, in the presence of metal driers and oxygen, break their double bonds and convert from a liquid to a "solid". Although conventional drying oils, such as linseed oil, tung oil and other drying oils proper are, chemically, distinctly different from convertible alkyd resins or other convertible resins, in the presence of a metallic drier and oxygen the breakdown of the convertible alkyd resins contributes what may be characterized as a drying oil component which is considered together with the drying oil proper of pipe varnish compositions made in accordance with our invention to calculate the desirable or optimal amount of metallic drier to be added to any given pipe varnish compositions made in accordance with our invention which may include a convertible alkyd or similar functioning resin. Calculations in this regard, as to drying oil aspects or components of convertible alkyd or like resins, are made on the solids portions of such resins and which may be characterized, in this regard, as vehicle solids. Convertible resins are, per se, well known to the art and include not only alkyd resins, but, also, various modified alkyd resins, various oil-modified polyurethanes, and various epoxy resins, but, so far as we are aware, their use in pipe varnish compositions of the nature of the pipe varnish compositions of our present invention has not heretofore been known. The inclusion of convertible resins in pipe varnish compositions of the present invention generally enhance drying time as well as playing a favorable role in regard to ultimate film hardness and chemical and/or water resistance. On the dry cured film basis, the convertible resins, when used in conjunction with drying oils, will generally constitute from about 8 to about 25 wt. %, especially advantageously from about 10 to about 20 wt. % of the dry cured film.

We have found, as generally indicated above, as one aspect of various of the pipe varnish compositions of our invention, prior to application of films or coatings of said compositions to the steel pipes, that the pipe varnish compositions of our invention may contain, for instance from about 14 or 15 wt. % of the drying oil or drying oils or even up to 50 wt. %, generally advantageously between about 20 to about 30 wt. %; in combination with said inorganic-organic complexes, as such, in amounts in the range of about 10 to about 40 wt. %, particularly advantageously from about 16 or 18 to about 22 wt. %, of our pipe varnish compositions.

We have also found that pipe varnish compositions made in accordance with our invention may contain, prior to application to the steel pipes, less than 10 wt. % of drying oils provided, among other things, that certain other ingredients are present in our pipe varnish compositions to provide the desired utility thereof as effective pipe varnish compositions. However, mineral oils or other nonvolatile oils are not present in proportions such as to cause the film or coatings to be soft and tacky. In this connection, it may be pointed out that the corrosion-inhibiting compositions of the aforesaid U.S. Pat. No. 3,925,087 are fundamentally functionally and commercially worthless as pipe varnish compositions because, as disclosed in said patent, they contain very high contents of diluent oils, such as mineral oils and/or other hydrocarbon diluents which have boiling points above 150° C. (at least about 300° F.), and such diluent oils are generally present in the corrosion-inhibiting compositions of said patent in proportions of at least about 60 wt. % of said compositions. Generally speaking, any mineral oils or other inert nonvolatile oil diluents, if present at all, should not exceed about 5 wt. % of our pipe varnish compositions and, better still, should be less than that amount and preferably essentially absent from our pipe varnish compositions.

DETAILED DESCRIPTION

In the broadest aspects of our present invention, the essential ingredients of our pipe varnish compositions, for optimum overall effectiveness, comprise one or more of each of the following ingredients: thixotropic overbased calcium sulfonate/calcium carbonate complex; volatile organic, preferably hydrocarbon, solvent; drying oil; convertible resin; and drier. These, and with or without other ingredients, and generally the broader ranges of their proportions, are set out below in terms of approximate parts by weight of our novel pipe varnish compositions.

| Ingredients | Ranges in Parts By Weight |
|---|---|
| Thixotropic Overbased Calcium Calcium Carbonate Complexes[1] | 15 to 50 |
| Volatile Organic Solvents | 20 to 50 |
| Drying Oils | 9 to 50 |
| Modifying Resins[2] | 4 to 50 |
| Petrolatums, Oxidized Petrolatums and/or Crude Waxes and/or Neutral Oils | 0 to 30 |
| Thermoplastic Resins | 0 to 20 |
| Driers | 0.3 to 2 |
| Anti-Skinning Agents | 0 to 1 |
| Epoxidized Oils and/or Polybutenes | 2 to 20 |

[1]Based on nonvolatile component
[2]Convertible resins, e.g. alkyds, epoxy resins, oil-modified polyurethane resins, etc.

Narrower and particularly preferred pipe varnish compositions and the approximate ranges of the proportions of the ingredients thereof are as follows:

| Ingredients | Ranges in Parts By Weight |
|---|---|
| Thixotropic Overbased Calcium Sulfonate/Calcium Carbonate Complexes | 16-20 |
| Volatile Organic Solvents | 30-40 |
| Drying Oils | 9-18 |
| Modifying Resins | 4-18 |
| Petrolatums, Oxidized Petrolatums and/or Crude Waxes and/or Neutral Oils | 0-10 |
| Thermoplastic Resins | 0-10 |
| Driers | 0.4-0.7 |
| Anti-Skinning Agents | 0.2-0.5 |
| Epoxidized oils and/or Polybutenes | 2-10 |

The particularly preferred pipe varnish compositions of our invention, as noted above, may contain additional ingredients or additives as well. Among such additional ingredients or additives which are particularly advantageously included in our coating compositions are one or more, and, particularly more than one, of the following: waxes, most desirably crude waxes and greases such as Baytown Grease; crude or refined microcrystalline waxes; polyethylene waxes (oxidized or unoxidized); petrolatums (oxidized or unoxidized); petroleum greases; asphalts; bitumens; epoxidized triglyceride oils, particularly epoxidized drying oils, especially epoxidized linseed oil such as "Drapex 10.4" (Argus Chemical Corporation) which have high oxirane contents; water-insoluble but volatile organic solvent-soluble or miscible resins of various types. It is generally desirable, in particular situations, to include in our varnish compositions non-skinning or anti-skinning agents, particularly suitable being that sold under the trade designation "Exskin II" (Methyl Ethyl Ketoxime) which is used in very minor proportions, generally well less than 1 wt. %, usually about 0.3 to 0.4 wt. %.

Supplemental ingredients can be added, such as colorants; semi-drying oils such as safflower oil, soya bean oil and tall oil; but, if used, are employed in distinctly minor proportions, generally not exceeding about 1 or 2 wt. %. Where non-clear coatings are desirable, the use of extenders and/or pigments at levels upwards to about 5 wt. % are found to be advantageous in salt fog and QUV testing.

Generally speaking, in at least those instances in which optimal pipe varnish compositions are prepared in accordance with our invention, such compositions have or tend to have improved corrosion resistance, as evidenced by salt spray, salt fog testing procedures, or acclerated weathering (i.e., QUV) over corrosion-inhibiting films made from overbased thixotropic inorganic-organic complexes which do not contain drying oils and driers. Particularly more significant is the improved film hardness, abrasion-resistance, and generally higher extent of permanence afforded a thixotropic overbased complex by the use of drying oils utilized according to our present invention.

The examples of pipe varnish compositions made in accordance with our present invention set forth hereinbelow are given by way of illustration only and not by way of limitation as numerous other compositions can readily be prepared in light of the teachings and guiding principles disclosed above. All parts listed are by weight. They include preferred embodiments of the invention. We consider Examples 1 and 2, particularly Example 2, as constituting, generally, the best embodiments of our invention viewed from an overall standpoint.

From what has been set forth above as to composition of "SACI" 700 and "SACI" 760, the evaporation of the mineral spirits results in leaving only the inorganic-organic complex per se. Where, for instance, "SACI" products are used as starting materials for the preparation of the pipe varnish compositions of our invention, and where such "SACI" products contain mineral spirits, and where they contain microcrystalline wax and/or oxidized petrolatum, these ingredients and the amounts thereof must be taken into account in arriving at any particular pipe varnish composition or formulation desired to be made in accordance with our invention. There is, of course, no requirement whatsoever that "SACI" products as heretofore or presently commercially marketed be used as starting materials for the preparation of the pipe varnish compositions of our present invention. The starting thixotropic overbased calcium organic sulfonate/calcium carbonate complexes as such, or per se, and as indicated above, can be made as described in various of the aforementioned patents such as, for instance, U.S. Pat. Nos. 3,453,124; 3,492,231; and 3,816,310.

The order of the mixing or blending of the ingredients is not critical, any convenient orders of addition being generally satisfactory and being determined by the skill of one having ordinary skill in the art. If, for any reason, in the preparation of the pipe varnish compositions of our invention, heat stripping of volatile organic solvent is desired to be carried out, blending order is necessary only to exclude the epoxidized oils and the driers from the heat stripping operation; and, after said stripping, then to add the epoxidized oil and the drier. The heat reached during stripping would cause gelling if the epoxidized oil and/or the drier were present in the pipe varnish composition when the heat stripping step was carried out.

EXAMPLE 1

| Ingredients | (Colloidal) (Dispersion) | | % Dry Film |
|---|---|---|---|
| "SACI"-700 (50% N.V.) | 37.5 | | 41.96 |
| Mineral Spirits | 32.3 | | |
| Crude Microwax | 3.7 | | 8.2 |
| Boiled Linseed Oil | 14.0 | | 31.1 |
| Drapex 10.4 | 3.7 | | 8.2 |
| Beckosol 10-027 (60% N.V.) | 7.9 | | 10.5 |
| Cobalt (12%) | 0.09 | Total: 0.56 | 0.02 |
| Zirconium (12%) | 0.47 | | 0.12 |
| Exskin #2 | 0.34 | | — |
| | 100.00* | | 100.00* |

*Approximately 100%

EXAMPLE 2

| Ingredients | Colloidal % (Dispersion) | | |
|---|---|---|---|
| "SACI"-760 (60% N.V.) | 31.2 | | 42.76 |
| Mineral Spirits | 37.9 | | |
| Crude Microwax | 3.8 | | 8.4 |
| Boiled Linseed Oil | 9.3 | | 20.7 |
| Beckosol 10-088 (70% N.V.) | 13.3 | | 20.7 |
| Polybutene (S-24) | 3.8 | | 8.4 |
| Cobalt (12%) | 0.14 | | 0.02 |
| Zirconium (12%) | 0.31 | Total: 0.57% | 0.05 |
| Manganese (12%) | 0.12 | | 0.02 |
| Exskin #2 | 0.33 | | — |
| | 100.2* | | 100.00* |

*Approximately 100%

EXAMPLE 3

| Ingredients | Colloidal % (Dispersion) |
|---|---|
| "SACI"-760 (Modified to provide same solids basis as with Example 2 use of 37 SACI"-700) | 37.5 |
| Mineral Spirits | 32.3 |
| Crude Microwax | 3.7 |
| Boiled Linseed Oil | 14.0 |
| Drapex 10.4 | 3.7 |

-continued

| Ingredients | Colloidal % (Dispersion) | |
|---|---|---|
| Beckosol 10-027 (60% N.V.) | 7.9 | |
| Cobalt (12%) | 0.09 | } Total 0.56% |
| Zirconium (12%) | 0.47 | |
| Exskin #2 | 0.34 | |
| | 100.00* | |

*Approximately 100%

EXAMPLE 4

| Ingredients | Colloidal % (Dispersion) | |
|---|---|---|
| "SACI"-760 (Modified to provide same solids basis as with Example 2 use of "SACI"-700) | 37.5 | |
| Mineral Spirits | 32.3 | |
| Crude Microwax | 3.7 | |
| Boiled Linseed Oil | 14.0 | |
| Polybutene S-24 | 3.7 | |
| Beckosol 10-027 (60% N.V.) | 7.9 | |
| Cobalt (12%) | 0.09 | } Total 0.56% |
| Zirconium (12%) | 0.47 | |
| Exskin #2 | 0.34 | |
| | 100.00* | |

*Approximately 100%

EXAMPLE 5

| Ingredients | Colloidal % (Solution) |
|---|---|
| "SACI"-760 (Modified to provide same solids basis as with Example 2 use of "SACI"-700) | 37.5 |
| Mineral Spirits | 32.3 |

-continued

| Ingredients | Colloidal % (Solution) | |
|---|---|---|
| Crude Microwax | 3.7 | |
| Boiled Linseed Oil | 14.0 | |
| Polybutene S-24 | 3.7 | |
| Beckosol 10-088 (70% N.V.) | 7.9 | |
| Cobalt (12%) | 0.09 | } Total 0.56% |
| Zirconium (12%) | 0.47 | |
| Exskin #2 | 0.34 | |
| | 100.00* | |

*Approximately 100%

EXAMPLE 6

| Ingredients | Colloidal % (Dispersion) | |
|---|---|---|
| "SACI"-760 (Modified to provide same solids basis as with Example 2 use of 37 SACI"-700) | 37.5 | |
| Mineral Spirits | 32.3 | |
| Crude Microwax | 3.7 | |
| Boiled Linseed Oil | 14.0 | |
| Drapex 10.4 | 3.7 | |
| Beckosol 10-027 (60% N.V.) | 7.9 | |
| Cobalt (12%) | 0.09 | } Total 0.56% |
| Zirconium (12%) | 0.47 | |
| Exskin #2 | 0.34 | |
| | 100.00* | |

*Approximately 100%

The following TABLE I discloses some comparative performance tests of pipe varnish compositions some in current commercial usage in steel mills; and others, experimentally tested, which were made in accordance with our present invention; and another, also an experimental one, made by admixing "SACI"-2400 with and ESCOREZ resin.

TABLE I

COMPARATIVE PERFORMANCE OF PIPE VARNISH COMPOSITIONS

| Test | "SACI"-2400 ESCOREZ | A. Commercial Pipe Varnish Consisting Solely of Long Chain Alkyd with Pb Driers Organic Solvent Reduced to 45% Solids | B. Commercial Pipe Varnish - Acrylic Modified Alkyd Resin in Volatile Hydrocarbon Solvent | Example 1 Present Application | Example 2 Present Application |
|---|---|---|---|---|---|
| Solids | 45 | 45 | 39 | 45 | 45 |
| Viscosity (#4 Ford Cup) Seconds | — | 27 | 20 | 24 | 18 |
| Flash Point (Cleveland open cup) | — | 115–120° F. | 110–115° F. | 125–130° F. | 125–130° F. |
| Skinning: Open Cup 3 Days | — | Partial | Moderate Skin | Partial | Partial |
| Dry Time (Hard) hours 78° F. | — | 5.0 | 0.5 | 6.0 | 6.0 |
| QCT: Humidity Testing (3 days) | | | | | |
| 1.0 mils | — | Both: bad subfilm | Both: bad subfilm | No rust or discolor | No rust or discolor |
| 2.0 mils | — | Rusting & discolor | Rusting & discolor | Slight discolor No rusting | Slight discolor No rusting |
| Salt Fog Exposure (ASTM) (B117) | | | | | |
| 0.5 mils | 832 | 72 | 288 | — | 480 |
| 1.0 mils | 1128 | 120 | 408 | 500 | 827 |
| 2.0 mils scribe | 500 hrs: 4 mm creep | 132 hrs: very bad rust | 72 hrs: bad rust & creep film lost | 384 hrs: bad rust scribe | 500 hrs: 5–6 mm creep |
| 2.0 mils face rust | 500 hrs: No rust | 132 hrs: very bad rust | 336 hrs: total film loss and rust | 384 hrs: bad rust | 500 hrs: bad rust |
| QUV Accelerated | | | | | |

TABLE I-continued
COMPARATIVE PERFORMANCE OF PIPE VARNISH COMPOSITIONS

| Test | "SACI"-2400 ESCOREZ | A. Commercial Pipe Varnish Consisting Solely of Long Chain Alkyd with Pb Driers Organic Solvent Reduced to 45% Solids | B. Commercial Pipe Varnish - Acrylic Modified Alkyd Resin in Volatile Hydrocarbon Solvent | Example 1 Present Application | Example 2 Present Application |
|---|---|---|---|---|---|
| Weathering | | | | | |
| 2.0 mils | 314 hrs: 50% rust | 336 hrs: Bad discolor 5% spot rust | 1000 hrs: 20% rust | 336 hrs: 2% rust | 500 hrs: 20% light rust |
| Outdoor Exposure (Trainer, PA) | | | | | |
| 2.0 mils | 85% Days: 90% rust | 200 Days: Rust 20% | 1 panel pulled at 82 Days: rust in marks 125 Days: 2 still running | 70 Days: rust | 110 Days and running |
| Application Characteristics | — | Newtonian; poor film build: sags & runs, no water displacement ability | Newtonian; poor film build: sags & runs; no water displacement ability | Thixotropic; good film build: no running Has water displacement | Thixotropic; good film build: no running Has water displacement |
| Dry Film | Soft | Hard; not brittle | Hard and brittle | Fairly hard; not brittle | Fairly hard; not brittle |

The A commercially used pipe varnish composition, in accelerated laboratory testing (salt fog, QUV and QCT) performed poorly; but, under the milder conditions of actual outdoor exposure, it performed adequately, providing that said pipe varnish film was a 2 mil undamaged film. With less than a film thickness or with a marred film the pipe varnish film was a failure, tending to "fall apart". Furthermore, said A commercial pipe varnish composition did not hold its film thickness when applied to the steel pipe (the film thickness at the top of the pipe being <0.5 mil). In addition, line set-ups at different steel mills cause much film marring from both the rollers used to move the steel pipe on line and the steel "kick out" arms used to remove the coated pipe off the line. These situations, which are not uncommon in commercial steel pipe operating conditions at steel mills producing steel pipe, result, overall, in unsatisfactory performance of known commercial pipe varnish compositions.

The B commercial pipe varnish composition, while representing an improvement in certain respects over the A commercial pipe varnish composition, was also less than satisfactory from a number of standpoints, as is apparent from TABLE I.

The data in TABLE I with respect to the pipe varnish compositions of Example 1 of our present application show it to be superior in all areas of accelerated testing. Outdoor exposure showed an advantage for the A commercial pipe varnish composition but it should be noted the number reported for the pipe varnish composition Exhibit 1 is questionably low. One area of importance not noticeable in the numbers is that the composition of Example 1 does not undercut its own film once corrosion has started. The A commercial product, when taking into account the film marring on line, is an important factor which must be taken into account.

While the pipe varnish composition of Example 1 of our invention was a definite improvement, overall, in relation to commercial pipe varnish compositions tested, it was found that it was somewhat too thixotropic for optimum usage in that, in its use, there was virtually no running or sagging. It is considered that, for fully optimum usage that some relatively slight running or, worded otherwise, some secondary flow, is desirable in those situations where marring occurs due to the particular steel pipe coating equipment which may exist at certain steel mills. In such situations, the extent of thixotropicity can readily be modified or adjusted to meet that specific problem while still maintaining the requirement that the pipe varnish compositions of our invention possess the property of thixotropicity.

With further regard for Example 1, it may be noted that in experimental test runs it exhibited excellent water displacement properties. This is an important and highly advantageous property since, in various steel mills which produce steel pipe, such pipe is pressure tested with water and sometimes damp pipe is, on various occasions, coated with pipe varnish compositions.

Example 3 is a variant of Example 1 in which the "SACI"-700 was replaced with "SACI"-760 adjusted to provide the same solids content that was provided by the "SACI"-700 of Example 1. This resulted in a pipe varnish composition with improved secondary flow, due to a decrease in thixotropy, without leading to excessive film running. There was also an extra benefit in that, generally speaking, some improvment was obtained in at least most of the other test areas.

Example 4 is a further variant of Example 3 in which the Drapex 10.4 was replaced by Polybutene S-24. The Polybutene S-24 not only imparted good long term adhesion of pipe varnish compositions of our invention to steel pipes but it resulted in significantly improving the QUV values and outdoor exposure properties and had the still further advantages of being distinctly less U.V. and water-sensitive than the epoxidized oils represented by Drapex 10.4 which it replaced.

Example 5 is a further variant of Example 4 in which the alkyd resin (Beckosol 10-027) (60% N.V.) replaced by Beckosol 10-088 (70% N.V.) and by increasing the amount of said alkyd resin so that it constitutes 50 wt. % instead of 25 wt. % of the resin solids in the pipe varnish compositions of our invention, but the amount of resin solids as a whole remained constant. The effect of this change was to reduce dry time and provide a greater hardness to the ultimate film.

Example 6 is a still further variant in which the Beckosol 10-088 (70% N.V.) was replaced by Beckosol 10-027 (60% N.V.) primarily for comparison purposes.

Test results of Examples 3, 4, 5 and 6 are shown in the following TABLE II.

TABLE II

|  | A | B | C | D |
|---|---|---|---|---|
| Formula Change | "SACI"-700 in Example 1 replaced with equal solids basis with S-760 | Drapex 10.4 replaced with Polybutene S-24 | Alkyd (10-088) replaced 10-027 and increased from 25% to 50% of Resin Solids | Same formula as C, but Alkyd 10-027 replaced Alkyd 10-088 primarily for comparison purposes |
| Primary Reason for Change | To reduce thixoptropy of the system | To increase U.V. and water resistance | To reduce dry time and produce harder film |  |
| Salt Fog Evaluation (ASTM D-117) |  |  |  |  |
| 0.5 mils | 760 | 384 | 368 | 648 |
| 1.0 mils | 552 | 720 | 720 | 776 |
| 2.0 mils scribes | 500 hrs: Moderate rust and rundown | 384 hrs: Rust and rundown | 384 hrs: Rust and rundown | 504 hrs: Rust and rundown |
| 2.0 mils face rust (500 hrs) | No rust | 10% Rust | 15% Rust | 25% Rust and some blisters |
| QUV Accelerated Weathering |  |  |  |  |
| 2.0 mils | 552 hrs: All rust | 574 hrs: 1% rust | 574 hrs: 10% rust | 440 hrs: 40% rust |
| Outdoor Exposure (Trainer) |  |  |  |  |
| 2.0 mils | 110 days: Still running | 100 days: Still running | 100 days: Still running | 83 days: Failed, 25% rust |

We claim:

1. A pipe varnish composition including, as essential ingredients, (a) a thixotropic overbased calcium organic sulfonate/calcium carbonate complex, (b) a drying oil, (c) at least one member selected from the group of epoxidized oils and convertible resins, (d) a drier, and (e) a volatile organic solvent carrier in which said ingredients are dissolved or colloidally dispersed, said pipe varnish composition, after application in the form of a thin film or coating on steel pipe surface and curing, forming a hard essentially non-oily film which protects said steel pipes against corrosion during storage for substantial periods of time.

2. A composition according to claim 1, in which, in the thixotropic overbased calcium organic sulfonate/calcium carbonate complex, the organic part is an alkylbenzene in which alkyl contains from 12 to 30 carbon atoms.

3. A composition according to claim 2, in which the drying oil is a linseed oil.

4. A composition according to claim 3, in which the linseed oil is at least one member selected from the group of blown linseed oils and heat-bodied linseed oils.

5. A composition according to claim 4, in which the epoxidized oil is epoxidized linseed oil and in which the convertible resin is a polybutene resin.

6. A composition according to claim 5, in which the drier is a mixture of cobalt naphthenate and zirconium octoate, in which the amount of zirconium octoate is substantially in excess of the cobalt naphthenate.

7. A composition according to claim 6, in which the drier also includes a manganese salt.

8. A composition according to claim 7, in which the volatile organic solvent carrier is mineral spirits.

9. A composition according to claim 8, which contains an effective amount, not more than 1 wt. % of the composition, of an anti-skinning agent.

10. A pipe varnish composition in the form of a colloidal dispersion including, as essential ingredients, (a) a thixotropic overbased calcium organic sulfonate/calcium carbonate complex, (b) a drying oil, (c) a modifying resin, (d) a drier, and (e) a volatile solvent carrier in which said ingredients are dissolved or colloidally dispersed, said ingredients being present in proportions by weight of said pipe varnish composition approximately as follows:
   (a) 15 to 50
   (b) 9 to 50
   (c) 15 to 50
   (d) 0.3 to 2
   (e) 20 to 50 said pipe varnish composition, after application in the form of a thin film or coating on steel pipe surfaces and curing, forming a hard essentially non-oily film which protects said steel pipes against corrosion during storage for substantial periods of time.

11. A pipe varnish composition in the form of a colloidal dispersion including, as essential ingredients, (a) a thixotropic overbased calcium organic sulfonate/calcium carbonate complex, (b) a drying oil, (c) at least one member selected from the group of epoxidized oils and convertible resins, (d) a drier, and (e) a volatile organic solvent carrier in which said ingredients are dissolved or colloidally dispersed, said ingredients being present in proportions in parts by weight of said pipe varnish composition approximately as follows:
   (a) 16 to 20
   (b) 9 to 18
   (c) 4 to 18
   (d) 0.4–0.7
   (e) 30–40 said pipe varnish composition, after application in the form of a thin film or coating on steel pipe surfaces and curing, forming a hard essentially non-oily film which protects said steel pipes against corrosion during storage for substantial periods of time.

12. A composition according to claim 11, which includes up to about 20 parts of nonconvertible resins.

13. A composition according to claim 11, which includes a distinctly minor but effective amount of methyl ethyl ketoxime as an anti-skinning agent.

14. A composition according to claim 11, in which, in the thixotropic overbased calcium organic sulfonate/calcium carbonate complex, the organic part is an alkylbenzene in which alkyl contains from 12 to 30 carbon atoms.

15. A composition according to claim 14, in which the drying oil is a linseed oil.

16. A composition according to claim 15, in which the epoxidized oil is an epoxidized linseed oil and in which the convertible resin is an alkyd resin.

17. A pipe varnish composition in the form of a colloidal dispersion containing the following ingredients in substantially the following proportions in terms of parts by weight:

| | |
|---|---|
| a 60 weight % colloidal dispersion of a thixotropic overbased calcium organic sulfonate complexed with calcium carbonate | 31.2 |
| Mineral Spirits | 37.9 |
| Boiled Linseed Oil | 9.3 |
| Crude Microwax | 3.8 |
| Convertible Alkyd Resin 70% nonvolatile | 13.3 |
| Polybutene | 3.8 |
| Driers containing | |

-continued

| | |
|---|---|
| Cobalt | 0.14, |
| Zirconium | 0.31, and |
| Manganese | 0.12 |
| Methyl Ethyl Ketoxime | 0.34 |

18. A method for inhibiting the corrosion of steel pipe which comprises depositing on the surfaces thereof a film or coating of the composition of claim 1 and then curing said film or coating.

19. A method for inhibiting the corrosion of steel pipe which comprises depositing on the surfaces thereof a film or coating of the composition of claim 11 and then curing said film or coating.

20. A steel pipe which has been protected against corrosion for appreciable periods of time in storage by the deposit on the surface thereof the composition of claim 1, followed by curing of said composition.

21. A steel pipe which has been protected against corrosion by the deposit on the surface thereof the composition of claim 11, followed by curing of said composition.

22. A steel pipe which has been protected against corrosion by the deposit on the surface thereof the composition of claim 18.

* * * * *